(12) United States Patent
Lee

(10) Patent No.: US 7,652,399 B2
(45) Date of Patent: Jan. 26, 2010

(54) LINEAR VIBRATOR

(75) Inventor: Kap Jin Lee, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 387 days.

(21) Appl. No.: 11/687,967

(22) Filed: Mar. 19, 2007

(65) Prior Publication Data

US 2007/0216235 A1 Sep. 20, 2007

(30) Foreign Application Priority Data

Mar. 17, 2006 (KR) .................... 10-2006-0024850
Jul. 6, 2006 (KR) .................... 10-2006-0063383

(51) Int. Cl.
*H02K 7/00* (2006.01)
(52) U.S. Cl. ..................... 310/67 R; 310/15
(58) Field of Classification Search .............. 310/15, 310/17, 67 R, 71, 81, 91
See application file for complete search history.

(56) References Cited

U.S. PATENT DOCUMENTS

| | | | | |
|---|---|---|---|---|
| 5,546,069 A | * | 8/1996 | Holden et al. | 340/407.1 |
| 5,650,763 A | * | 7/1997 | McKee et al. | 340/407.1 |
| 5,956,622 A | * | 9/1999 | Lee | 340/7.6 |
| 6,529,611 B2 | * | 3/2003 | Kobayashi et al. | 381/396 |
| 6,537,234 B1 | * | 3/2003 | Komatsu | 601/46 |
| 6,590,991 B1 | * | 7/2003 | Maeda | 381/409 |
| 6,724,908 B2 | * | 4/2004 | Fukuyama | 381/396 |
| 6,744,904 B2 | * | 6/2004 | Kobayashi et al. | 381/396 |
| 7,454,031 B2 | * | 11/2008 | Kajiwara et al. | 381/396 |
| 2005/0184601 A1 | * | 8/2005 | Kweon et al. | 310/36 |
| 2006/0002577 A1 | * | 1/2006 | Won et al. | 381/396 |

* cited by examiner

*Primary Examiner*—Thanh-Tam T Le
(74) *Attorney, Agent, or Firm*—Saliwanchik, Lloyd & Saliwanchik

(57) ABSTRACT

Embodiments of a linear vibrator are provided that are capable of reducing the manufacturing cost, increasing the product reliability and increasing the vibrating quantity. An embodiment of a linear vibrator can include a case formed of an upper case portion and a lower case portion coupled to each other to provide a predetermined inner space; a substrate disposed on an upper surface of the lower case portion; a first coil and a second coil installed at both end parts inside of the case and connected to the substrate; a spring having one side fixed on at least one of the inside faces of the case; and a magnet fixed at another side of the spring and located between the first and second coils inside of the case, where the magnet can vertically vibrate through an interaction with the first and second coils.

20 Claims, 5 Drawing Sheets

LINEAR VIBRATOR

CROSS-REFERENCE TO RELATED APPLICATIONS

The present application claims priority under 35 U.S.C. § 119 to Korean Patent Application No. 10-2006-0024850, filed Mar. 17, 2006, and Korean Patent Application No. 10-2006-0063383, filed Jul. 6, 2006, which are hereby incorporated by reference in their entirety.

BACKGROUND

1. Field of the Invention

The present invention relates to a linear vibrator. A linear vibrator is an apparatus having a vibrating unit which generates a vibration by a reciprocating motion.

2. Description of the Related Art

A related art linear vibrator is provided in a circular shape. The linear vibrator includes a circular case, a coil mounted at the bottom surface of the circular case, a circular vibrating unit contained inside of the circular case, a magnet fixed at the circular vibrating unit, and a spring appending the vibrating unit to the circular case. As for the operation of the vibrator, if an electric power is supplied to the coil, the vibrating unit oscillates up and down by an electromagnetic force generated between the coil and the magnet.

However, the related art circular vibrator has a difficulty being miniaturized. More particularly, the related art circular vibrator is formed in a circular shape. Because the circular vibrator and other components are installed together in a communication apparatus, there exist useless spaces between the external face of the related art vibrator and the external faces of the other components. Thus, there is a limitation in miniaturizing a communication apparatus employing the related art circular vibrator, which has a difficulty in miniaturization. It has been considered to replace the circular vibrator case with a hexahedron case having a square shaped section to solve this problem. However, it is difficult to arrange circular components such as a circular vibrating unit in a square shaped case.

There has previously been presented a linear vibrator consisting of a square shaped case and square shaped components to solve a problem caused by providing the vibrator in a circular shape. A related art square shaped vibrator includes a pair of magnets stacked in both the upper and the lower end parts of the case, and a coil located in the internal space of the case and appended to the case by a spring. In operation, if electric power is supplied to the coil, an electromagnetic force generates a vibration.

However, since the related art vibrator has a pair of magnets respectively positioned at both end parts of a square shaped case, the related art vibrator requires four magnets. Since the related art linear vibrator requires many magnets, which can be expensive, the production cost of the linear vibrator increases.

Furthermore, since the related art vibrator has a structure in which the coil itself vibrates up and down, a load can be applied to the coil. As a result, there is a problem in that the repeated load may be transmitted to an outlet line which is connected in the coil, so that the outlet line can be cut. Therefore, there is a shortcoming that may decrease the reliability of the product.

Moreover, there is an action that reduces a magnetic flux connected from the pair of magnets stacked up and down with mutually-crossing polarity to the coil. More particularly, a flux extending from one of the magnets to the coil should be horizontally directed to the coil, but there is a problem in that the flux may be pulled into the other magnet and be extinguished. Therefore, there may occur a reduction of the magnetic flux density in the horizontal direction, resulting in a reduction of the electromagnetic force generated between the coil and a magnet and a reduction of the vibration quantity. Accordingly, there may be a delay of time interval until the normal vibrating quantity is reached.

BRIEF SUMMARY

An embodiment of the present invention provides a linear vibrator capable of reducing the manufacturing cost, increasing the product reliability, increasing the vibrating quantity, and/or more quickly reaching the normal vibrating quantity.

An embodiment of the present invention provides a linear vibrator comprising: a case including an upper case portion and a lower case portion coupled to each other to provide a predetermined inner space; a substrate disposed on an upper surface of the lower case portion; a first coil and a second coil installed at opposite ends inside of the case and connected to the substrate; a spring having one side fixed on at least one of the inside faces of the case; and a magnet fixedly supported on the other side of the spring and located between the first and second coils in the inner space of the case to vertically vibrate through interaction with the first and second coils.

An embodiment of the present invention provides a linear vibrator comprising: a case providing a predetermined inner space a first coil and a second coil which are fixed on opposite sides of the case and capable of being supplied with external power; a spring having one side coupled to one side of the case; and a magnet supported by the spring, disposed between the first and second coils to vertically vibrate through interaction with the first and second coils, a horizontal center plane of which being different from a horizontal center plane of the coils.

An embodiment of the present invention provides a linear vibrator comprising: a case provided with a predetermined inner space; a first coil and a second coil which are installed at opposite sides of the case, and each capable of being supplied with external power; a spring having one side coupled to the case; and a magnet fixed at the spring, having one side disposed to face the first coil and the other side disposed to face the second coil, wherein the magnet vibrates by moving in one direction through interaction with the first and second coils and then moving in another direction by elastic force of the spring. The movement length of the magnet in one direction with respect to a center of the coils can be different from the movement length in opposite direction.

According to many embodiments of the present invention, there can be an advantage of cost effectiveness and increased operational reliability by inhibiting a destruction of the linear vibrator. Furthermore, there can be advantages of increasing a vibrating quantity, minimizing a vibrator size and reaching a rated vibrating quantity more quickly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

A First Embodiment

Figure 1:
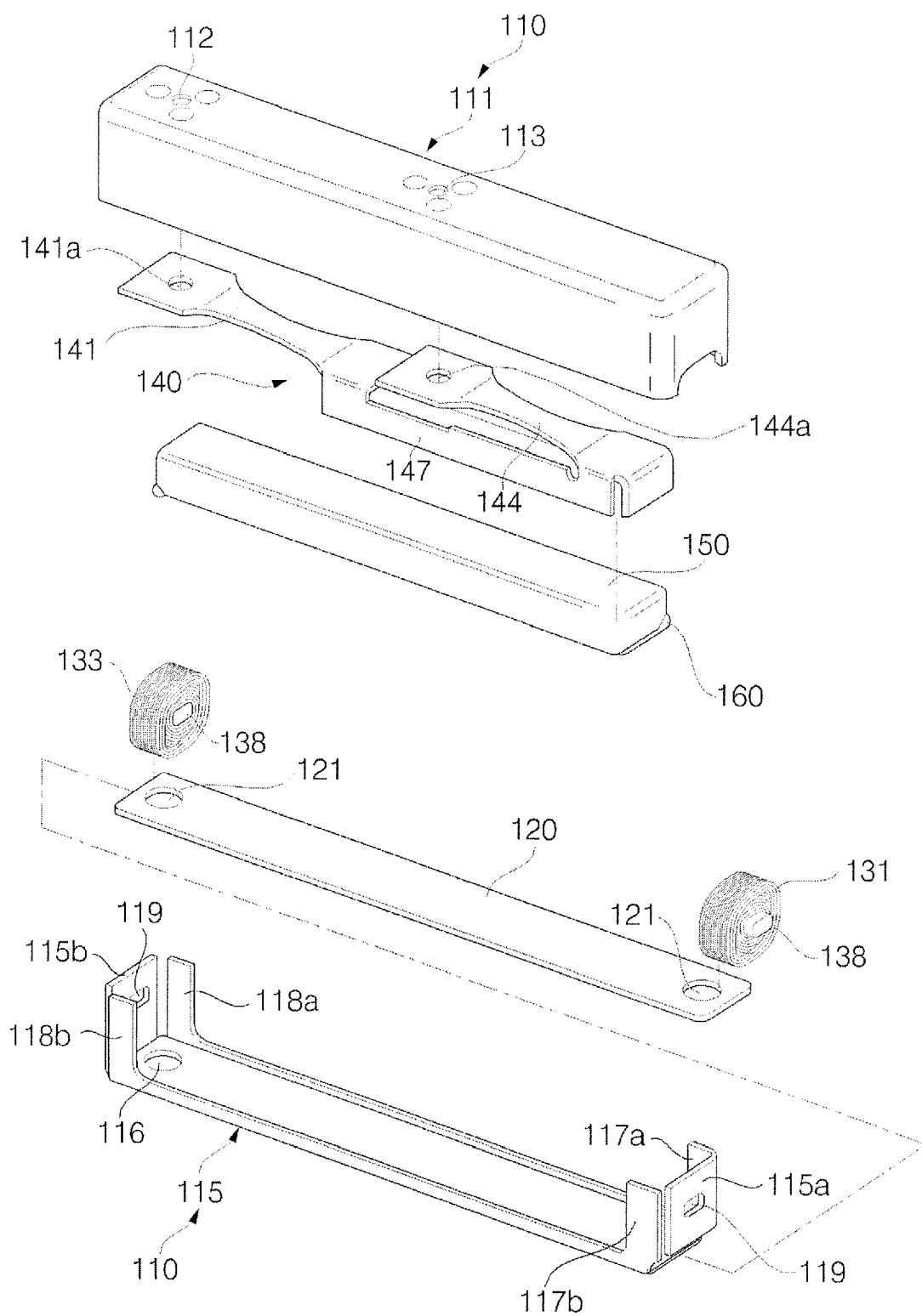
FIG. 1 is an exploded perspective view illustrating a linear vibrator according to an embodiment of the present invention.
Figure 2:
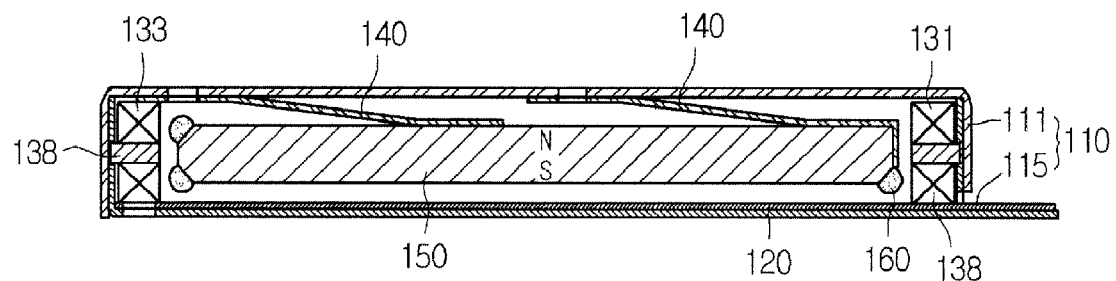
FIGS. 2 to 6 are cross-sectional views of a linear vibrator according to embodiments of the present invention.

FIG. 1 is an exploded perspective view illustrating a linear vibrator according to a first embodiment of the present invention. FIG. 2 is a cross-sectional view of the linear vibrator according to the first embodiment of the present invention.

Referring to FIG. 1, a square shaped case with a predetermined space on the inside can be prepared. The case 110 can include a square shaped upper case portion 111 and a square shaped lower case portion 115 that can be coupled to the upper case portion 111. The upper case portion 111 can have an open bottom side and the lower case portion 115 can have an open top and lengthwise sides.

The meaning of 'square shaped' can be narrowly interpreted as an approximate hexahedron so as to conveniently be arranged inside of a square shaped product such as a communication device. In addition, the meaning of 'square shaped' can also be broadly interpreted as a shape having at least one angle shaped side among the case's faces in contrast to having a circular shape.

However, the case may be preferable to be provided in a hexahedron shape for conveniences of controlling a vibrating quantity and installing a linear vibrator.

A flexible printed circuit board (FPCB) can be fixed on the upper surface of the lower case portion 115 with an adhesive or the like. A direction in which the current is supplied to coils can be patterned in the FPCB.

One or more display holes 116 and 121 can be correspondently formed to display a combination position between the lower case portion 115 and the FPCB 120 or to secure both portions to each other conveniently and tightly.

Supporters 117a, 117b, 118a and 118b can be formed as part of the lower case portion 115 at front and back lengthwise sides at both end parts.

The supporters 117a, 117b, 118a and 118b can support the girth of the FPCB 120 to inhibit a separation of the FPCB 120 towards the front side or the back side of the lower case portion 115.

The FPCB 120 can be inserted between the upper surface of the bottom and one side 115a of the lower case portion 115 and fixed to the upper surface of the bottom of the lower case portion 115.

There can be prepared a predetermined spacing between the upper surface of the bottom of the lower case portion 115 and the lower end of the one side 115a of the lower case portion 115 so that the FPCB 120 can be inserted between the upper surface of the bottom of the lower case portion 115 and the one side 115a.

The one side 115a may be provided by bending a plate member made of the same material as the lower case portion 115. For example, the one side 115a can be bent and extended from the supporter 117a.

A first coil 131 and a second coil 133 can be fixed to both sides 115a and 115b of the lower case portion 115. The first coil 131 and the second coil 133 can be connected to the FPCB 120.

The first coil 131 and the second coil 133 can be wound, preferably, around an external face of a core 138 prepared in the center of the coils to increase an electromagnetic force caused by an operation of magnet 150 as described below.

A support hole 119 can be located at each of the sides 115a and 115b of the lower case portion 115 for inserting and supporting the core 138.

The support hole 119 can indicate a secure position and increase a reliability of a fixed position.

When a core 138 is not provided for the coils 131 and 133, the support 119 does not need be used.

A spring, which can have a first arm 141, a second arm 144 and a holder 147, can be coupled to the lower surface of the upper case portion 111.

More particularly, an upper end of the first arm 141 can be fixed to the left (as oriented in FIG. 1) lower surface of the upper case portion 111, while a lower end of the first arm 141 can be located near the center of the upper case portion 111.

An upper end of the second arm 144 can be fixed to a center region of the upper case portion 111, while a lower end of the second arm 144 can be located at the right side (as oriented in FIG. 1) of the upper case 111.

Accordingly, the first and second arms 141 and 144 can be arranged along the length of the upper case portion 111 to form a cantilever shape.

A holder 147 can be prepared in a case shape opened to one side and a lower surface.

The one side of the holder 147 can be connected to a lower end of the first arm 141, while the other side of the holder 147 can be connected to a lower end of the second arm 144.

A side of the arms 141 and 144, which is opposed to the side secured to the upper case portion 111 and freely movable, can be referred to as the free end of the arms.

A magnet 150 can be formed in a square shape corresponding to the holder 147. The magnet can be inserted into the holder 147 and fixed between the first coil 131 and the second coil 133.

The end sides of the magnet 150 can be positioned near the first coil 131 and the second coil 133, respectively.

If an electric current is supplied to the first and second coils 131 and 133, the magnet 150 vibrates up and down by a magnetic field between the magnet 150 and the electric current flowing through the first coil and second coil 131 and 133.

Display holes 112, 141a, 113 and 144a are correspondently formed at the upper surface of the upper case portion and the first and second arms 141 and 144 to indicate combination positions or to secure both portions to each other conveniently and tightly.

Referring to FIG. 2, the polarity of magnet 150 is magnetized differently at the upper face and the lower face. Here, a single magnet 150 is used.

First and second coils 131 and 133 can be wound up and down as described in reference to FIG. 1.

Since a linear vibrator according to the first embodiment of the present invention can use a single magnet, the linear vibrator can have an advantage of reducing the manufacturing cost.

In this embodiment, the magnet 150 itself vibrates, while the first and second coils 131 and 133 are fixed at their positions.

Therefore, the problem where the first and second coils 131 and 133 are cut can be reduced or prevented.

Furthermore, since the coils are fixed at their positions, the linear vibrator can have an advantage of simplifying the process of installing the coils inside of the linear vibrator and increasing the reliability of the linear vibrator.

According to the Lorentz force, only horizontal magnetic lines of force directed to a coil among gradients of magnetic lines of force can provide a force for moving the magnet up and down.

Since the linear vibrator according to the first embodiment of the present invention has a single magnet 150 compared to the related art linear vibrator having a pair of stacked magnets, the horizontal magnetic flux density will not be reduced by the magnet 150. Therefore, the electromagnetic force and the vibrating strength will increase compared to the related art linear vibrator.

Accordingly, the time it takes for the linear vibrator to reach normal vibration from initial vibration may be decreased.

However, the lower face of the magnet 150 can be bumped against the FPCB 120 by the up and down vibration of the magnet 150, which may generate damages to the FPCB 120 and noise.

In a further embodiment, magnetic fluid 160 can be prepared at the lower ends of the magnet 150. A magnetic fluid is a fluid where a surfactant is added so as to avoid precipitation and cohesion after ultra fine particles of 0.01-0.02 μm size are stably dispersed with colloid type.

The magnetic fluid has a characteristic of maintaining a constant concentration of magnetic particles in fluid in spite of the influence of the external magnetic field, gravity and centrifugal force.

As described above, the first embodiment incorporates a linear vibrator case that is not only formed in a square shape, but also extends in a longitudinal direction, where at both ends of which coils are arranged.

This has purposes of fixing coils to a substantially precise position at the both ends of the case, increasing the operation reliability of the device, arranging a linear vibrator accurately in a communication device, and increasing the vibration quantity.

Figure 3:
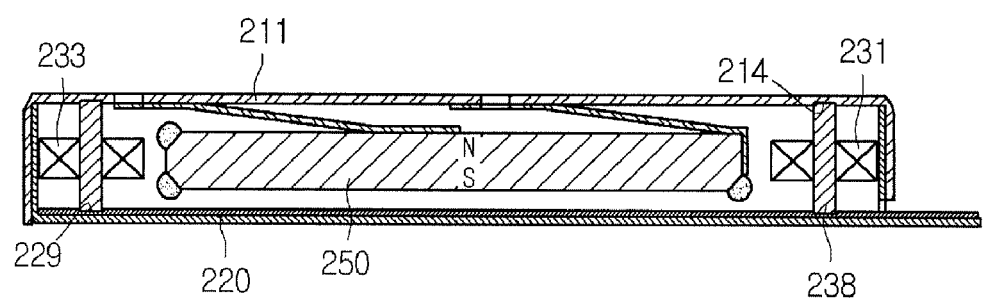
Figure 4:
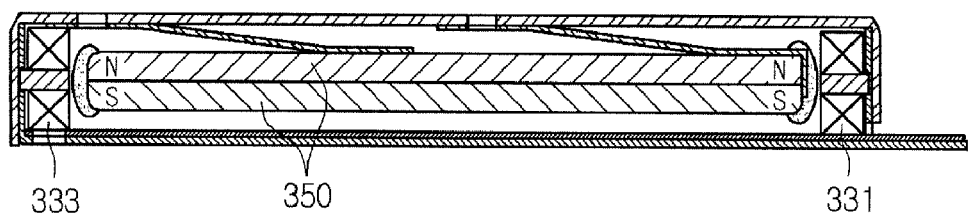
Figure 5:
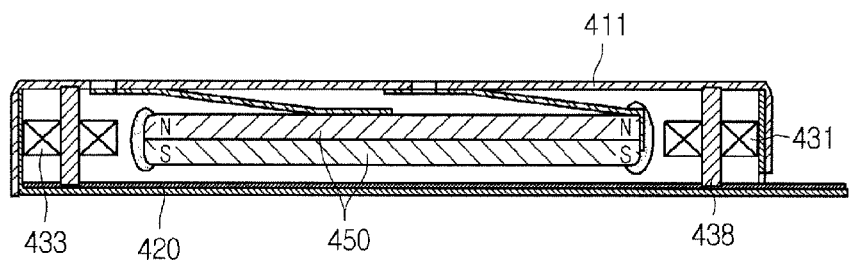

FIGS. 3 to 5 are cross-sectional views of a linear vibrator according to a second to a fourth embodiment of the present invention.

An explanation as described above can be referred to for an explanation of parts overlapping (being in common) with the first embodiment.

Explanations of characteristically different parts from the first embodiment will be described in more detail below.

A Second Embodiment

FIG. 3 is a cross-sectional view of a linear vibrator according to a second embodiment of the present invention.

Referring to FIG. 3, a linear vibrator according to the second embodiment of the present invention can have a magnet 250 magnetized with different polarities between the upper face and the lower face of the single magnet 250.

A first and second coil 231 and 233 can be wound in right and left directions.

In addition, the upper and lower ends of a core 238 can be inserted vertically into a support hole 214 formed at the upper case portion 211 and a support hole 229 formed at the FPCB 220, respectively, so that the core 238 can be supported.

Because the coils are wound in right and left directions (along a horizontal plane) as compared with the first embodiment, the second embodiment may decrease the magnetic flux which affects the magnet.

However, because the coils lay down along the lengthwise direction of the case, this embodiment can reduce the height of the linear vibrator as a whole.

This embodiment can also provide other advantages described in reference to the first embodiment.

A Third Embodiment

FIG. 4 is a cross-sectional view of a linear vibrator according to a third embodiment of the present invention.

Referring to FIG. 4, a linear vibrator according to the third embodiment of the present invention can have a magnet 350 magnetized with different polarities between a right side and a left side.

First and second coils 331 and 333 can be wound in the up and down directions (along a vertical plane). In addition, the linear vibrator according to this embodiment can have two stacked magnets 350.

This embodiment, in spite of increasing the manufacturing cost as compared to the first embodiment, still can have the advantages described with respect to the first embodiment.

Furthermore, since a linear vibrator according to this embodiment has ends of the magnet having a maximum polarity in alignment with a coil, it can obtain the maximum electromagnetic force and the maximum magnetic flux density at an adjacent range between the magnet and the coil.

A Fourth Embodiment

FIG. 5 is a cross-sectional view of a linear vibrator according to a fourth embodiment of the present invention.

Referring to FIG. 5, a linear vibrator according to the fourth embodiment of the present invention can have a magnet magnetized with different polarities between a right side and a left side.

The first and second coils 431 and 433 can be wound in right and left directions.

In addition, the linear vibrator according to this embodiment can have two stacked magnets 450.

The upper and lower ends of a core 438, similar to the second embodiment, can be vertically inserted into the upper case portion 411 and the FPCB 420, respectively, so that the core 438 can be supported.

There may be issues with cost reduction as described in the third embodiment and a reduction of the magnetic line of force as described in the second embodiment. However, a linear vibrator according to this embodiment can decrease the height of the linear vibrator and can obtain a maximum electromagnetic force.

A Fifth Embodiment

An explanation as described in the first embodiment can be referred to for an explanation of parts in common with the first embodiment.

Explanations of characteristically different parts from the first embodiment will be described in more detail below.

Figure 6:
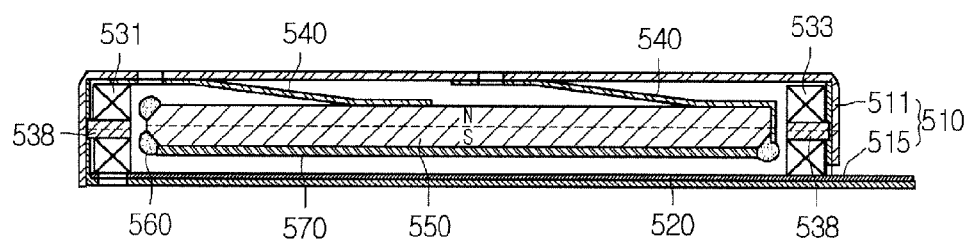

FIG. 6 is a cross-sectional view of a linear vibrator according to a fifth embodiment of the present invention.

Referring to FIG. 6, similarly to the first embodiment, there is provided a case having an upper case portion 511 and a lower case portion 515, a spring 540, coils 531 and 533, a core 538 and a substrate 520. The substrate can be prepared with FPCB, which is to be applied with an external electric power.

This embodiment has characteristics in that the shape of the magnet 550 is characteristically different from those described in the previous embodiments so that the center of the coils 531 and 533 is vertically spaced by a predetermined distance from the center of the magnet 550. In addition, a weight 570 can be further installed at a lower face of the magnet 550.

When the center of a vibrating object descends or ascends beyond a predetermined distance from the center of a coil, an electromagnetic force having an opposite direction to a direction to which the vibrating object is going to move is generated and interferes with the vibration of the vibrating object due to an excessive increase of the amplitude of the vibrating object. This can be referred to as an interference phenomenon.

The characteristic construction according to the fifth embodiment of the present invention for a linear vibrator, which generates a vibration caused by a one directional electromagnetic force, can inhibit the above described interference phenomenon.

Figure 7:
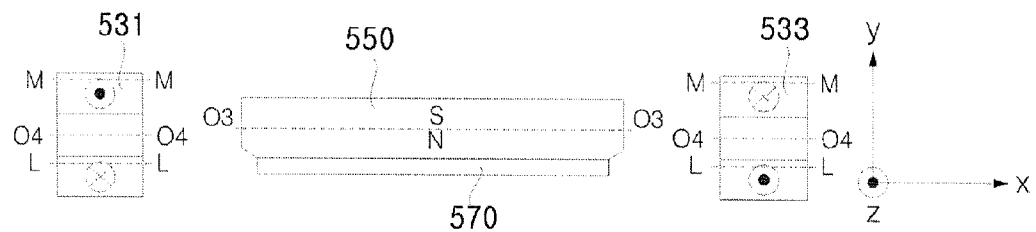
FIG. 7 is a schematic structure view illustrating an operational principle of a linear vibrator according to an embodiment of the present invention.

FIG. 7 is a schematic structure view illustrating an operational principle of a linear vibrator according to the fifth embodiment of the present invention.

Figure 8:
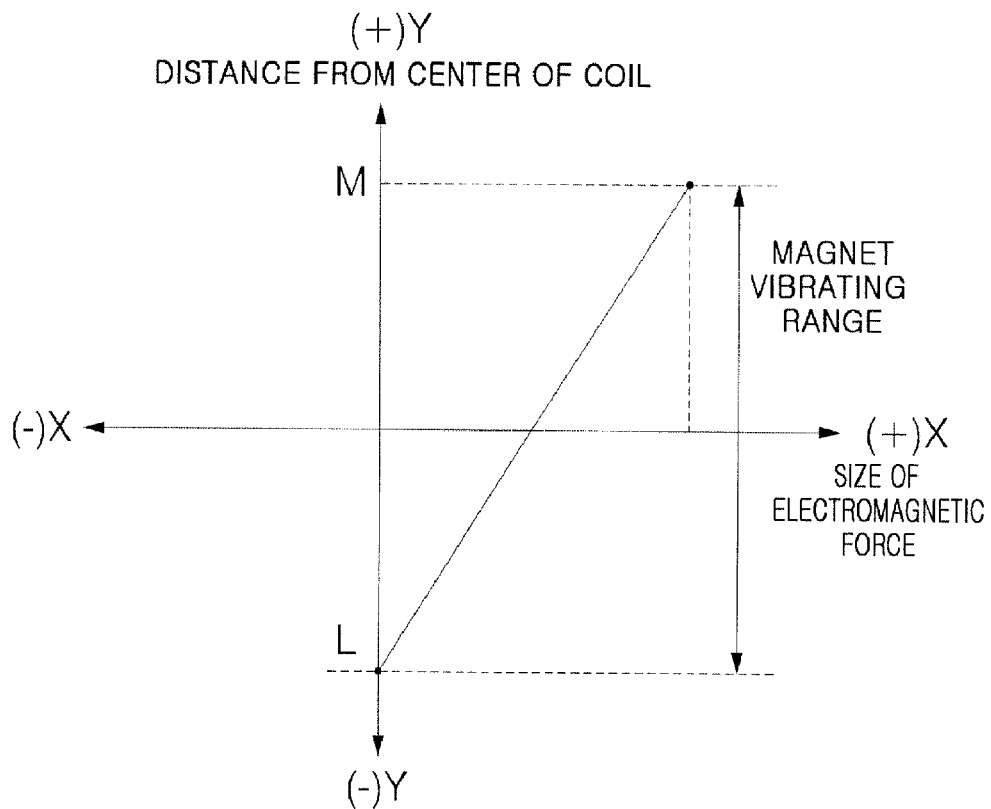
FIG. 8 is a graph showing a vibrating range and an electromagnetic force in the vibrating range of a linear vibrator according to an embodiment of the present invention.

FIG. 8 is a graph showing a vibrating range and an electromagnetic force in the vibrating range of a linear vibrator according to the fifth embodiment of the present invention.

Referring to FIG. 7, an electromagnetic force exerted on a magnet 550 can be generated in the Y-axis direction to vibrate the magnet 550 vertically.

This can be accomplished by magnetizing the magnet with S-pole at the upper face and N-pole at lower face.

First and second coils 531 and 533 can be wound up and down. Normal current can be applied to the first coil 531 and reverse current can be applied to the second coil 533. When the current is applied to the first and second coils 531 and 533, an electromagnetic force with a (+) Y-axis direction generated by an operation between the first coil 531 and the magnet 550 and an electromagnetic force with a (+) Y-axis direction generated by an operation between the second coil 533 and the magnet 550 moves the magnet 550 into the (+) Y-axis direction.

Then, when current supply is interrupted to the first and second coils 531 and 533 at the moment of maximum position of the magnet 550, the magnet 550 will descend in the (−) Y-axis direction by the elastic force of the spring 540.

When current supply is resumed to the first and second coils 531 and 533 at the moment of minimum position of the magnet 550, the magnet 550 will ascend in the (+) Y-axis direction by the elastic force of the spring 540 and the (+) electromagnetic force. Thus, the interruptions and resumptions of current supplies can be periodically repeated to the first and second coils 531 and 533 so as to vibrate the magnet 550.

On this motion of a magnet, when the center O3 of the magnet 550 in Y-axis direction is positioned close to the center of the first and second coils, there occurs a (+) electromagnetic force. However, when the center O3 of the magnet reaches a predetermined distance down from the center O4 of the first and second coils 531 and 533, there exists a point where the electromagnetic force is 0 with an interference between an X-axis gradient of a magnetic line of force directed to the first and second coils 531 and 533 in the magnet 550 and a Z-axis gradient of a magnetic line of force caused by current in the Z-axis direction.

In particular, this point, where there is no electromagnetic force exerted on the magnet, can be defined as a dead point where there occurs no vibration. If a magnet is positioned at the dead point, as in the case of no external electric power, there may occur no vibration in spite of an application of an external electric power.

If the magnet 550 further descends, a (−) electromagnetic force in the (−) Y-axis direction is formed around the magnet 550.

That is, when the center O3 of the magnet 550 reaches beyond a predetermined distance down from the center O4 of the first and second coils 531 and 533, a (−) electromagnetic force is exerted on the magnet 550 to be pulled down in the (−) Y-axis direction, so that the (−) electromagnetic force will interfere with ascent of the magnet 550 in the (+) Y-axis direction by the elastic force of the spring 540. Accordingly, there occurs a phenomenon that uselessly wastes electric power. This phenomenon may occur in the first embodiment.

However, according to the fifth embodiment, the magnet 550 can be inhibited or prevented from descending beyond a predetermined distance down from the center of the coils 531 and 533 in order to deal with the above described phenomenon. That is, when the magnet 550 ascends by the elastic of the spring 540, an electromagnetic force should be prevented from interfering with the motion of the magnet 550 by the operations between the first coil 531 or the second coil 533 and the magnet 550.

An explanation of the formation related to inhibiting or preventing an over-descent of a magnet will be fully described below.

At an initial state without a power supply, the Y-axis directional center O3 of the magnet 550 can be set at a higher position than the Y-axis directional center O4 of the first and second coils 531 and 533 so that the center of the magnet can be horizontally deviated from the center of the center of the coils. Thus, when the magnet 550 is positioned at a lower height, the stronger elastic force is exerted on the magnet 550 to descend to the shorter distance. Therefore, in an embodiment, there may not occur a (−) electromagnetic force.

As for the vibrating range of the magnet 550 shown in FIGS. 7 and 8, the magnet 550 can be inhibited from descending below a point L where the (−) electromagnetic force begins to be generated, that is, where the electromagnetic force is 0. Therefore, the ascending magnet 550 by the elastic force of the spring 540 will not be interrupted by a (−) electromagnetic force. It can be clearly understood by the diagram presented in FIG. 8 that there may be a (−) electromagnetic force when the diagram is downwardly extended beyond the point L. In other words, since the migration length of the magnet to one direction by the electromagnetic force is shorter than that to the reverse direction by the elastic force, it can be understood that the migration length is asymmetric about the center of the coils.

Meanwhile, a weight 570 can be installed under the magnet because of the deviation of the magnet center from the center of the coils, so that much more vibration quantity can be obtained by an increase of total magnet weight.

FIG. 8 illustrates a resultant force of electromagnetic forces generated between current through coils and a magnet. This resultant force is not expressed exactly in a straight line but a curve similar to a straight line.

Due to this structure, current can be applied to the first and second coils 531 and 533 within a range L to M where the magnet 550 ascends by the elastic force of the spring 540. Therefore, the amplitude of the magnet 550 corresponding to a designed value can be not only obtained, but also the rising time spent in reaching an amplitude corresponding to 90% of the designed value can be reduced.

According to this embodiment, the magnet 550 cannot descend or ascend beyond a predetermined distance, so that there may not occur an electromagnetic force during motion by the elastic force of the spring. Since the center of the magnet is positioned above the center of the coils, an initial position of the magnet is more distant from the dead point at the initial state. Therefore, there is little possibility that the center of the magnet will be positioned at the point where the electromagnetic force is 0, that is, the dead point. A linear vibrator according to this embodiment can be provided to always vibrate when current is applied to the coils.

Furthermore, a weight 570 made of metal with a high specific gravity can be coupled to the magnet 550, so that the vibrator according to this embodiment can obtain much more vibration quantity.

A Sixth Embodiment

Figure 9:
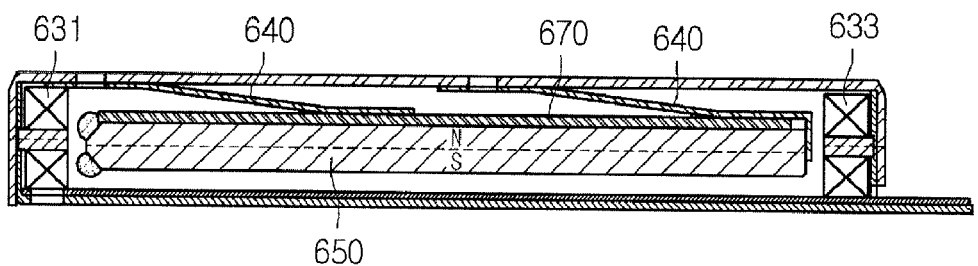
FIG. 9 is a sectional view of a linear vibrator according to an embodiment of the present invention.

FIG. 9 is a sectional view of a linear vibrator according to a sixth embodiment of the present invention. The explanation as described in reference to the fifth embodiment can be referred to for an explanation of parts in common with the fifth embodiment. An explanation of characteristics different from the fifth embodiment will be described in detail below.

Referring to FIG. 9, a linear vibrator according to the sixth embodiment can have a magnet 650 magnetized with N-pole at the upper side and S-pole at the lower side to be pulled down by a (−) electromagnetic force. The Y-axis directional center O5 of the magnet 650 can be set at a lower position than the Y-axis directional center O6 of the first and second coils 631 and 633 (see FIG. 10). A weight 670 can be installed at a space between the magnet 650 and the spring 640 so as to prevent the magnet 650 from ascending beyond a predetermined distance.

Figure 10:
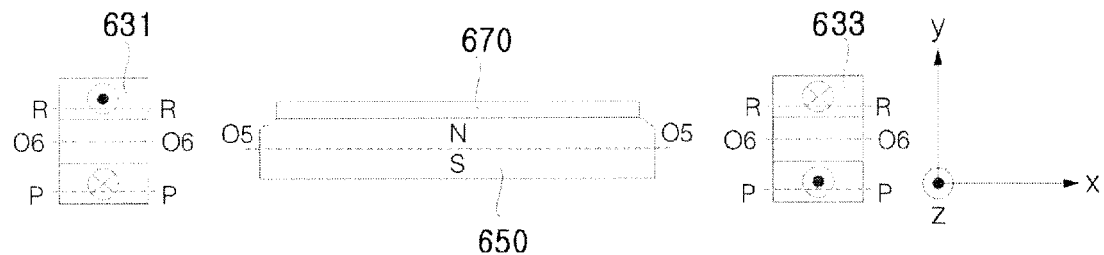
FIG. 10 is a schematic structure view illustrating an operational principle of a linear vibrator according to an embodiment of the present invention.
Figure 11:
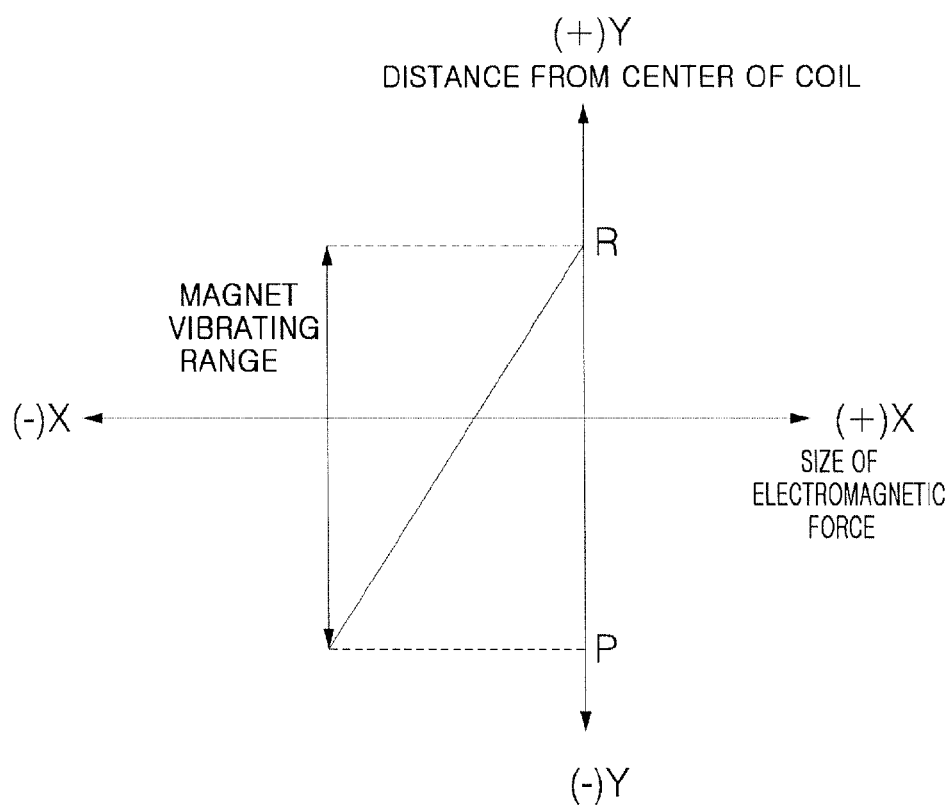
FIG. 11 is a graph showing a vibrating range and an electromagnetic force in the vibrating range of a linear vibrator according to an embodiment of the present invention.

FIG. 10 is a schematic structure view illustrating an operational principle of a linear vibrator according to the sixth embodiment of the present invention. FIG. 11 is a graph showing a vibrating range and an electromagnetic force in the vibrating range of a linear vibrator according to the sixth embodiment of the present invention.

Referring to FIGS. 10 and 11, if current is applied to first and second coils 631 and 633 at an initial state, the magnet 650 can descend in the (−) Y-axis direction. When current supply is interrupted to the first and second coils 631 and 633 at the moment of minimum height of the magnet 650, the magnet 650 will ascend in the (+) Y-axis direction by an elastic force of the spring 640. When current supply is resumed to the first and second coils 631 and 633 at the moment of minimum height of the magnet 650, the magnet 650 can descend in the (−) Y-axis direction by the elastic force of the spring 640 and a (−) electromagnetic force. Thus, the interruptions and resumptions of current supplies to the first and second coils 631 and 633 can be periodically repeated so as to vibrate the magnet 650.

Herein, if the Y-axis directional center of the ascending magnet 650 reaches a predetermined point R beyond the Y-axis directional center of the first and second coils 631 and 633, an electromagnetic force becomes 0. However, if the center of the magnet 650 is positioned above the point R, a (+) electromagnetic force in the (+) Y-axis direction is generated to raise the magnet 650 which was going to descend in the (−) Y-axis direction.

Since the Y-axis directional center O5 of the magnet 650 is below the Y-axis directional center O6 of the coils, the Y-axis directional center O5 of the magnet 650 can be inhibited from being positioned beyond the point R, so that the (+) electromagnetic force may not be generated. Therefore, the magnet 650 which descends in the (−) Y-axis direction by the spring 640 is not interrupted by the electromagnetic force. Since the center of the magnet 650 is relatively spaced from the dead point R, there is little possibility that the center of the magnet 650 will be positioned at the dead point R. Therefore, the magnet 650 can be inhibited or prevented from failing to vibrate.

The above fifth and sixth embodiments can further include a structure restricting the movable length of a magnet. The above additional modification within the scope of the present invention can be installed regardless of an array condition of the magnet, if there occurs a point where the electromagnetic force is 0 where the coils are wound up and down. Moreover, even if a magnet's vibration is interrupted by a change of the electromagnetic force regardless of the coil array, the above additional modification can be applied within the scope of the present invention. However, it should be understood that the additional modification could be more preferably applied within the scope of the present invention when there occurs a point where the electromagnetic force can be reversed by a vertical coil array.

For another modification, a linear vibrator can be operated without a weight in a case where the center of the coils is spaced by a predetermined distance from the center of a magnet. However, it should be also understood that an object such as a weight having a designated mass is preferably attached to a magnet.

Any technical construction included in one of embodiments as described above can be applied to another embodiment to provide a new embodiment within the scope of the present invention.

A linear vibrator according to the present invention can be not only provided in a square shape, but also can include just one or two magnets to reduce the manufacturing cost. Since the magnet vibrates up and down, the coils will not be cut, which results in an increase of the product reliability. Furthermore, it may be more convenient to install coils and manufacture the product.

Since a linear vibrator mounted with only one magnet will not reduce a horizontal magnetic flux which affects a magnet's vibrating power, there can be the advantages of increasing an electromagnetic force and decreasing a reach time to a normal vibrating quantity.

According to some embodiments, there is the effect of reducing the rising time by a magnet and producing much more vibrating quantity by increasing the mass of a vibrating unit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A linear vibrator, comprising:
a case comprising an upper case portion and a lower case portion coupled to each other to provide a predetermined inner space;
a substrate disposed on an upper surface of the lower case portion;
a first coil and a second coil positioned at opposite ends inside of the case and connected to the substrate;
a spring having one side fixed on at least one inside face of the case; and
a magnet fixedly supported at the other side of the spring and located between the first and second coils in the inner space of the case, wherein the magnet vertically vibrates by an interaction with the first and second coils.

2. The linear vibrator according to claim 1, wherein the lower case portion comprises side ends for supporting the first and second coils.

3. The linear vibrator according to claim 1, further comprising a display hole formed at the lower case portion and a corresponding display hole formed at the substrate for guiding a combination position between the lower case portion and the substrate.

4. The linear vibrator according to claim 1, wherein the lower case portion comprises at least one substrate supporter erected extending to the upper case along at least a portion of an edge of the lower case portion formed to prevent the substrate from separating from the lower case.

5. The linear vibrator according to claim 1, further comprising:
a holder fixing the magnet to the spring; and
wherein the spring comprises at least two arms one end of which is fixed at any face of the case and the other end of which is connected to the holder to support the holder elastically.

6. The linear vibrator according to claim 5, wherein display holes are respectively formed at the upper case portion and the one end of the at least two arms.

7. The linear vibrator according to claim 1, wherein a center of the magnet is different from a center of the first and second coils.

8. The linear vibrator according to claim 1, wherein the spring is fixed at an inner surface of the upper case portion opposite to the substrate.

9. The linear vibrator according to claim 1, further comprising a weight having a larger specific gravity than the magnet fixed on at least one side of the magnet.

10. The linear vibrator according to claim 1, further comprising a magnetic fluid provided on the magnet.

11. The linear vibrator according to claim 1, wherein each of the first and second coils includes a core.

12. The linear vibrator according to claim 1, wherein the substrate comprises a pattern of a direction in which a current is supplied to the first and second coils.

13. A linear vibrator, comprising:
a case providing a predetermined inner space;
a first coil and a second coil fixed on opposite sides of the case and capable of being supplied with external power;
a spring having one side coupled to one side of the case; and
a magnet supported by the spring and disposed between the first and second coils to vertically vibrate through an interaction with the first and second coils, wherein a horizontal center of the magnet is different from a horizontal center of the first and second coils.

14. The linear vibrator according to claim 13, wherein the magnet is magnetized with different polarities at upper and lower sides.

15. The linear vibrator according to claim 14, wherein the first and second coils are wound in a vertical plane or a horizontal plane.

16. The linear vibrator according to claim 13, wherein the magnet is magnetized with different polarities at right and left sides.

17. The linear vibrator according to claim 16, wherein the first and second coils are wound in a vertical plane or a horizontal plane.

18. A linear vibrator, comprising:
a case provided with a predetermined inner space;
a first coil and a second coil positioned at opposite sides of the case and capable of being supplied with external power;
a spring coupled one side to the case; and
a magnet fixed at the spring and one side end of the magnet faces the first coil and the other side end of the magnet faces the second coil, wherein the magnet vibrates by moving in one direction through an interaction with the first and second coils and moving in other direction by an elastic force of the spring,
wherein a movement length of the magnet in one direction with respect to a center of the first and second coils is different from a movement length in the opposite direction.

19. The linear vibrator according to claim 18, further comprising a weight disposed on a lower side of the magnet and having a higher specific gravity than that of the magnet,
wherein the magnet is disposed in the inner space of the case such that an upper side of the magnet has an S-pole and a lower side of the magnet has an N-pole to direct an electromagnetic force applied on the magnet to a (+) Y-axis direction, and a center of the magnet in a Y-axis direction is positioned above centers of the first and second coils in a Y-axis direction, and
wherein the first and second coils are vertically wound, and for Y-axis vibration of the magnet a current is applied to the first coil in a forward direction and a current is applied to the second coil in a reverse direction.

20. The linear vibrator according to claim 18, further comprising a weight disposed between the magnet and the spring and having a higher specific gravity than that of the magnet,
wherein the magnet is disposed in the inner space of the case such that an upper side of the magnet has an S-pole and a lower side of the magnet has an N-pole to direct an electromagnetic force applied on the magnet to a (−) Y-axis direction, and a center of the magnet in a Y-axis direction is positioned below centers of the first and second coils in a Y-axis direction, and
wherein the first and second coils are vertically wound, and for Y-axis vibration of the magnet a current is applied to the first coil in a forward direction and a current is applied to the second coil in a reverse direction.

* * * * *